(12) United States Patent
Arai et al.

(10) Patent No.: US 10,752,166 B2
(45) Date of Patent: Aug. 25, 2020

(54) DRIVING ASSISTANCE METHOD, AND DRIVING ASSISTANCE DEVICE, AUTOMATIC DRIVING CONTROL DEVICE, AND VEHICLE

(71) Applicant: Panasonic Intellectual Property Management Co., Ltd., Osaka (JP)

(72) Inventors: Yuko Arai, Kanagawa (JP); Koji Arata, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 116 days.

(21) Appl. No.: 16/087,288

(22) PCT Filed: Jan. 20, 2017

(86) PCT No.: PCT/JP2017/001880
§ 371 (c)(1),
(2) Date: Sep. 21, 2018

(87) PCT Pub. No.: WO2017/168987
PCT Pub. Date: Oct. 5, 2017

(65) Prior Publication Data
US 2019/0100136 A1 Apr. 4, 2019

(30) Foreign Application Priority Data

Mar. 31, 2016 (JP) .................. 2016-072729

(51) Int. Cl.
*B60Q 1/50* (2006.01)
*B60Q 1/38* (2006.01)
(Continued)

(52) U.S. Cl.
CPC .............. *B60Q 1/50* (2013.01); *B60Q 1/38* (2013.01); *B60Q 1/44* (2013.01); *B60Q 1/448* (2013.01);
(Continued)

(58) Field of Classification Search
CPC ... B60Q 1/50; B60Q 1/38; B60Q 1/44; B60Q 1/448; B60W 30/182; B60W 40/09; B60W 50/04
(Continued)

(56) References Cited

U.S. PATENT DOCUMENTS 6,225,918 B1 * 5/2001 Kam ................. B60Q 1/44
180/169
8,044,782 B2 * 10/2011 Saban ................ B60N 2/002
340/438

(Continued)

FOREIGN PATENT DOCUMENTS

JP 8-164766 6/1996
JP 2016-005932 1/2016

OTHER PUBLICATIONS

International Search Report of PCT application No. PCT/JP2017/001880 dated Mar. 21, 2017.

*Primary Examiner* — Yazan A Soofi
(74) *Attorney, Agent, or Firm* — Seed IP Law Group LLP

(57) ABSTRACT

A determination unit determines whether a driving behavior of a vehicle is performed by automatic driving control or manual driving control. A generation unit generates presentation instructing information for presenting the driving behavior by the automatic driving control externally from the vehicle when the determination unit determines that the driving behavior of the vehicle is performed by the automatic driving control, and generates presentation instructing information for presenting the driving behavior by the manual driving control externally from the vehicle when the determination unit determines that the driving behavior of the vehicle is performed by the manual driving control. An output unit outputs presentation instructing information generated by the generation unit.

11 Claims, 8 Drawing Sheets

(51) Int. Cl.
  *B60Q 1/44* (2006.01)
  *B60W 30/182* (2020.01)
  *B60W 40/09* (2012.01)
  *B60W 50/04* (2006.01)
  *G08G 1/16* (2006.01)
(52) U.S. Cl.
  CPC .......... *B60W 30/182* (2013.01); *B60W 40/09* (2013.01); *B60W 50/04* (2013.01); *G08G 1/16* (2013.01)
(58) Field of Classification Search
  USPC .......................................................... 701/36
  See application file for complete search history.

(56) References Cited

U.S. PATENT DOCUMENTS

| | | | |
|---|---|---|---|
| 8,626,554 B2* | 1/2014 | Chin | G06Q 10/109 705/7.16 |
| 2016/0311323 A1* | 10/2016 | Lee | B60K 37/06 |
| 2018/0118109 A1* | 5/2018 | Fujisawa | B60Q 3/18 |
| 2018/0292820 A1* | 10/2018 | Marberger | B60W 50/14 |
| 2019/0011914 A1* | 1/2019 | Park | G05D 1/0061 |
| 2019/0110729 A1* | 4/2019 | Yamataka | A61B 5/1495 |

* cited by examiner

| Presenting unit 60 | Presentation in manual driving | Presentation in automatic driving |
|---|---|---|
| 1 | Presentation color: red | Presentation color: yellow |
| 2 | Presentation position: up | Presentation position: down |
| 3 | Presentation character: character 1(manual) | Presentation character: character 2(auto) |
| 4 | Presentation pattern: on for 0.5 seconds, off for 0.5 seconds | Presentation pattern: on for 0.5 seconds, off for 0.8 seconds |

| Presenting unit 60 | Presentation in manual driving | Presentation in automatic driving |
|---|---|---|
| 5 | Presentation color: orange | Presentation color: green |
| 6 | Presentation position: up | Presentation position: down |
| 7 | Presentation character: character 1(manual) | Presentation character: character 2(auto) |

72

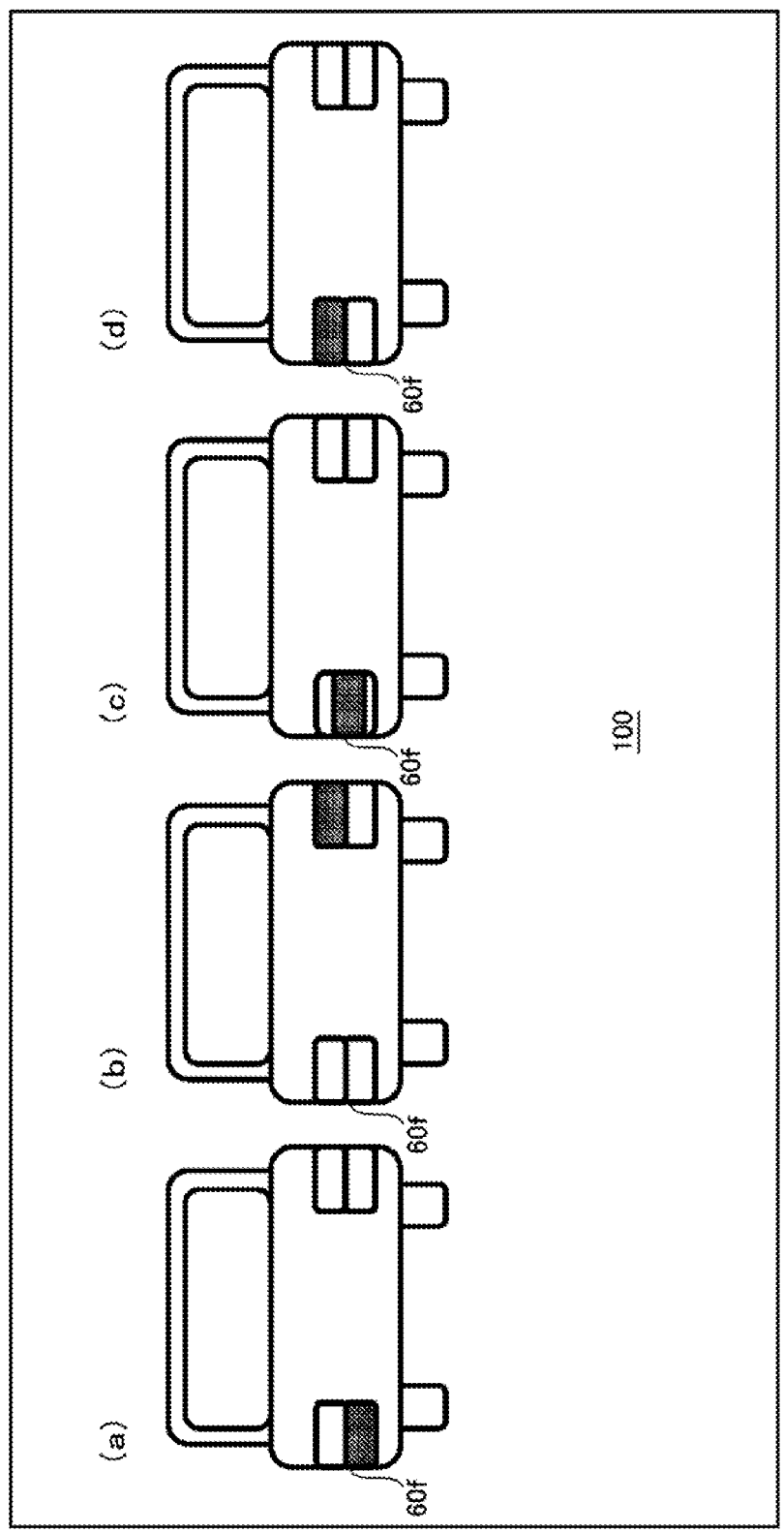

DRIVING ASSISTANCE METHOD, AND DRIVING ASSISTANCE DEVICE, AUTOMATIC DRIVING CONTROL DEVICE, AND VEHICLE

This application is a U.S. national stage application of the PCT International Application No. PCT/JP2017/001880 filed on Jan. 20, 2017, which claims the benefit of foreign priority of Japanese patent application No. 2016-072729 filed on Mar. 31, 2016, the contents all of which are incorporated herein by reference.

TECHNICAL FIELD

The present invention relates to a vehicle, a driving assistance method applied to the vehicle, and a driving assistance device, an automatic driving control device, and a driving assistance system, and a program using the driving assistance method.

BACKGROUND ART

In order to prevent traffic accidents, an advanced emergency braking system (AEBS) is increasingly mounted on vehicles. Further, automatic driving of vehicles has been developed actively, and the automatic driving is classified into a plurality of levels including a level that one or more of acceleration, braking, and steering are automatically performed, through a level that all of the acceleration, braking, and steering are performed completely automatically. In the AEBS, an automatic driving control device is a device that determines how to brake a vehicle and how to accelerate, brake and steer the vehicle in automatic driving and performs control. In a vehicle into which such an automatic driving control device is mounted, when an deceleration speed based on an operation of a brake pedal is larger than a predetermined value, stop lamp lighting control to be made by the brake pedal is prioritized over lamp flashing control during an automatic brake operation (for example, see PTL 1).

CITATION LIST

Patent Literature

PTL 1: Unexamined Japanese Patent Publication No. H8-164766

SUMMARY OF THE INVENTION

A driving assistance device of a certain aspect of the present disclosure includes a determination unit that determines whether a driving behavior of a vehicle is performed by automatic driving control or manual driving control. The driving assistance device includes a generation unit that generates presentation instructing information for presenting the driving behavior by the automatic driving control externally from the vehicle when the determination unit determines that the driving behavior of the vehicle is performed by the automatic driving control, and generates presentation instructing information for presenting the driving behavior by the manual driving control externally from the vehicle when the determination unit determines that the driving behavior of the vehicle is performed by the manual driving control, and an output unit that outputs the presentation instructing information generated by the generation unit.

Another aspect of the present disclosure provides an automatic driving control device. This device includes a determination unit that determines whether the driving behavior of the vehicle is performed by the automatic driving control or the manual driving control. Further, the device includes a generation unit that generates presentation instructing information for presenting the driving behavior by the automatic driving control externally from the vehicle when the determination unit determines that the driving behavior of the vehicle is performed by the automatic driving control, and generates presentation instructing information for presenting the driving behavior by the manual driving control externally from the vehicle when the determination unit determines that the driving behavior of the vehicle is performed by the manual driving control. Further, the device includes an output unit that outputs the presentation instructing information generated by the generation unit, and an automatic driving controller that controls automatic driving of the vehicle when the driving behavior of the vehicle is performed by the automatic driving control.

Still another aspect of the present disclosure provides a vehicle. This vehicle includes a driving assistance device. The driving assistance device includes a determination unit that determines whether a driving behavior of the vehicle is performed by automatic driving control or manual driving control. Further, the driving assistance device includes a generation unit that generates presentation instructing information for presenting the driving behavior by the automatic driving control externally from the vehicle when the determination unit determines that the driving behavior of the vehicle is performed by the automatic driving control, and generates presentation instructing information for presenting the driving behavior by the manual driving control externally from the vehicle when the determination unit determines that the driving behavior of the vehicle is performed by the manual driving control, and an output unit that outputs the presentation instructing information generated by the generation unit.

Still another aspect of the present disclosure provides a driving assistance method. This method includes determining whether a driving behavior of a vehicle is performed by automatic driving control or manual driving control. Further, the method includes generating presentation instructing information for presenting the driving behavior by the automatic driving control externally from the vehicle when the determination is made that the driving behavior of the vehicle is performed by the automatic driving control, and generating presentation instructing information for presenting the driving behavior by the manual driving control externally from the vehicle when the determination is made that the driving behavior of the vehicle is performed by the manual driving control, and outputting the presentation instructing information having been generated.

Note that any desired combinations of the above-described components and modifications of the features of the present disclosure in devices, systems, methods, programs, recording media containing the programs, vehicles on which the present devices are mounted, or other entities are still effective as other aspects of the present disclosure.

According to the present disclosure, information on whether the driving behavior is performed by the automatic driving or the manual driving can be presented externally from the vehicle.

BRIEF DESCRIPTION OF DRAWINGS

FIG. 5 is a diagram illustrating a data structure of a table stored in a generation unit in FIG. 3.

FIG. 7 is a diagram illustrating a data structure of another table stored in the generation unit in FIG. 3.

FIG. 8 is a diagram illustrating another configuration of the rear portion of the vehicle in FIG. 1.

DESCRIPTION OF EMBODIMENT

Figure 1:
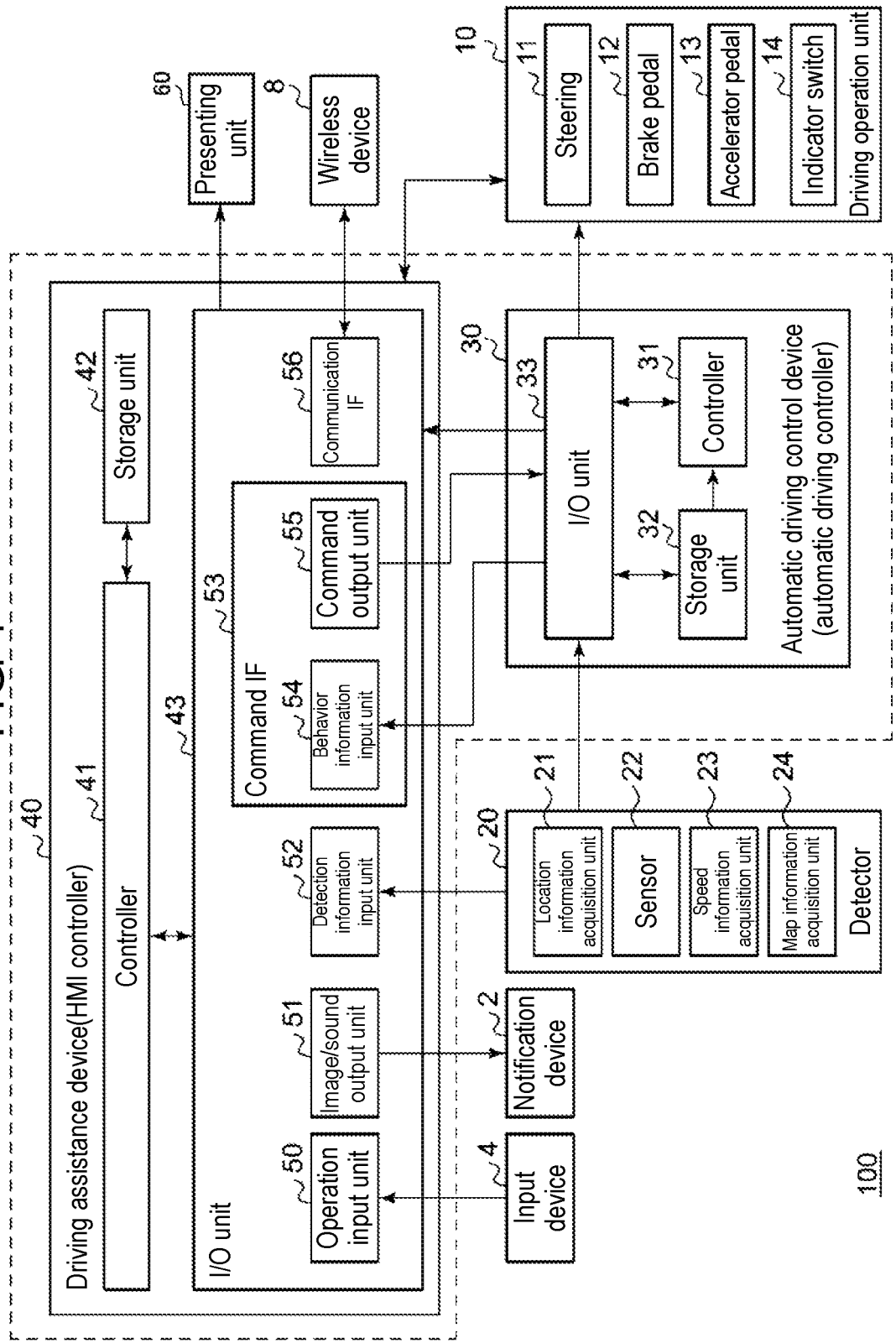
FIG. 1 is a diagram illustrating a configuration of a vehicle according to an exemplary embodiment.

Prior to describing an exemplary embodiment of the present invention, problems found in conventional techniques will now briefly be described herein. According to the conventional techniques, only when deceleration is larger in manual driving than in automatic driving, a flashing manner of the brake lamp differs. For this reason, at a normal time, whether deceleration is performed by the automatic driving or the manual driving cannot be discriminated by only viewing a brake lamp.

The present disclosure is devised in view of such a situation, and its object is to provide a technique that presents whether the driving behavior is performed by the automatic driving or the manual driving externally from the vehicle.

Prior to specifically describing the present invention, an outline of the present invention will be described herein. The present exemplary embodiment relates to the automatic driving and the manual driving of the vehicle. In particular, the present exemplary embodiment relates to a device (hereinafter also referred to as a "driving assistance device") that controls a human machine interface (HMI) for exchanging information regarding a driving behavior of the vehicle with an occupant (for example, a driver) of the vehicle. The "driving behavior" includes an operating state such as steering and braking during traveling and stopping of the vehicle, or control contents relating to the automatic driving control. For example, the driving behavior is constant speed traveling, acceleration, deceleration, pause, stop, lane change, course change, right and left turns, parking, or the like. Moreover, the driving behavior may be cruising (running while keeping a lane and maintaining a vehicle speed), lane keeping, following a preceding vehicle, stop and go during following, lane change, passing, a response to a merging vehicle, crossover (interchange) including entry and exit to and from an expressway, merging, response to a construction zone, response to an emergency vehicle, response to an interrupting vehicle, response to lanes exclusive to right and left turns, interaction with a pedestrian and a bicycle, avoidance of an obstacle other than a vehicle, response to a sign, response to restrictions of right and left turns and a U turn, response to lane restriction, response to one-way traffic, response to a traffic sign, response to an intersection and a roundabout, or the like.

It is preferable for a person who is outside a vehicle which travels through selection of any one of the automatic driving and the manual driving to be capable of recognizing whether the driving behavior of the vehicle is performed by the automatic driving or the manual driving. For example, when a brake is put on the vehicle, it is preferable to be able to recognize whether the braking is performed by the automatic driving or the manual driving. In the present exemplary embodiment, when the braking of the vehicle is performed, a determination is made whether the braking is performed by the automatic driving or the manual driving. Then, the braking is presented externally from the vehicle such that display varies according to a determined content.

Hereinafter, the exemplary embodiment of the present invention will be described in detail with reference to the drawings. Note that each exemplary embodiment described below is only illustrative, and does not limit the present invention.

FIG. 1 illustrates a configuration of vehicle 100 according to the exemplary embodiment, and particularly illustrates a configuration related to automatic driving and manual driving. Vehicle 100 can travel in an automatic driving mode, and includes notification device 2, input device 4, wireless device 8, driving operation unit 10, detector 20, automatic driving control device 30, driving assistance device 40, and presenting unit 60. The devices illustrated in FIG. 1 may be interconnected by exclusive lines or wire communication such as controller area network (CAN). Alternatively, the devices may be interconnected by wire communication or wireless communication such as a universal serial bus (USB), Ethernet (registered trademark), Wi-Fi (registered trademark) and Bluetooth (registered trademark).

Notification device 2 notifies the driver of information regarding travel of vehicle 100. Notification device 2 is a display for displaying information, such as a light emitting element, e.g., a light emitting diode (LED), provided on, for example, a car navigation system, a head-up display, a center display, a steering wheel, a pillar, a dashboard, and a vicinity of an instrument panel in the vehicle interior. Moreover, notification device 2 may be a speaker for notifying the driver of information converted into a sound, or may be a vibrator provided on a position (for example, a driver seat, a steering wheel, or the like) where the driver can sense vibrations. Furthermore, notification device 2 may be a combination of these elements. Input device 4 is a user interface device that receives an operation input performed by an occupant. For example, input device 4 receives information regarding automatic driving of the subject vehicle. The information has been input by the driver. Input device 4 outputs the received information as an operation signal to driving assistance device 40.

Figure 2:
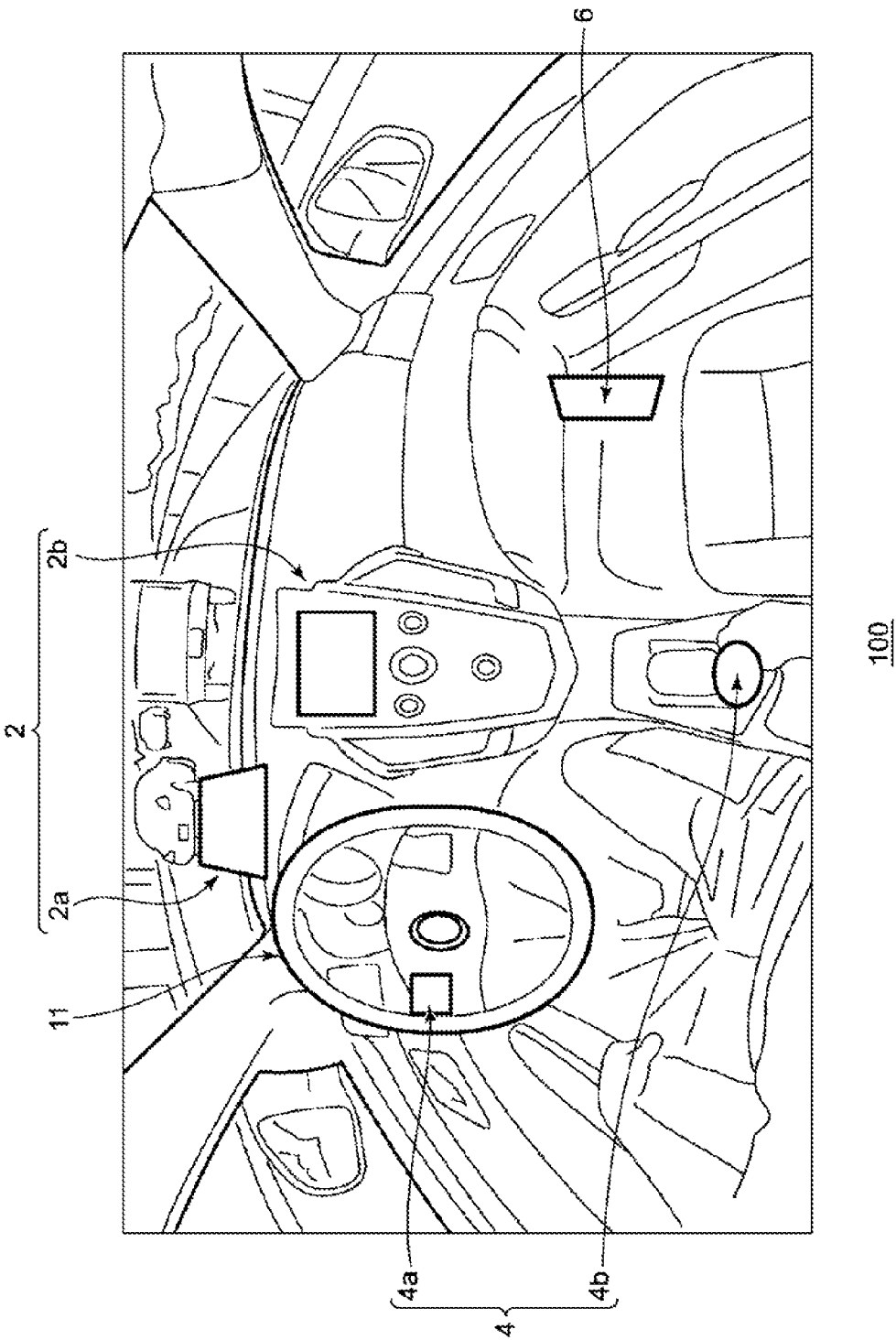
FIG. 2 is a diagram schematically illustrating an interior of the vehicle in FIG. 1.

FIG. 2 schematically illustrates an interior of vehicle 100. Notification device 2 may be head-up display (HUD) 2a or center display 2b. Input device 4 may be first operation unit 4a mounted on steering 11 or second operation unit 4b mounted between a driver seat and a passenger seat. Note that notification device 2 and input device 4 may be integrated with each other, and for example, may be mounted as a touch panel display. Speaker 6 for presenting sound information regarding the automatic driving to the occupant may be mounted on vehicle 100. In this case, driving assistance device 40 may cause notification device 2 to display an image indicating information regarding the automatic driving, and in addition to or in place of this configuration, may output a sound indicating the information regarding the automatic driving from speaker 6. The description returns to FIG. 1.

Wireless device 8 is adapted to a mobile phone communication system, wireless metropolitan area network (WMAN) or the like, and executes wireless communication. Driving operation unit 10 includes steering 11, brake pedal 12, accelerator pedal 13, and indicator switch 14. Steering 11, brake pedal 12, accelerator pedal 13, and indicator switch 14 can be electronically controlled respectively by a steering electrical control unit (ECU), a brake ECU, at least one of an engine ECU and a motor ECU, and an indicator controller. In the automatic driving mode, the steering ECU, the brake ECU, the engine ECU, and the motor ECU drive actuators according to control signals supplied from automatic driving control device 30. In addition, the indicator controller turns on or off an indicator lamp according to a control signal supplied from automatic driving control device 30.

On the other hand, in the manual driving mode, steering 11, brake pedal 12, accelerator pedal 13, and indicator switch 14 are operated by a driver. This operation controls the steering ECU, the brake ECU, at least one of the engine ECU and the motor ECU, and the indicator controller.

Detector 20 detects a surrounding situation and a travel state of vehicle 100. For example, detector 20 detects a speed of vehicle 100, a relative speed of a preceding vehicle with respect to vehicle 100, a distance between vehicle 100 and the preceding vehicle, a relative speed of a vehicle in an adjacent lane with respect to vehicle 100, a distance between vehicle 100 and the vehicle in the adjacent lane, and location information of vehicle 100. Detector 20 outputs the various pieces of detected information (hereinafter referred to as "detection information") to automatic driving control device 30 and driving assistance device 40. Detector 20 includes location information acquisition unit 21, sensor 22, speed information acquisition unit 23, and map information acquisition unit 24.

Location information acquisition unit 21 acquires the current location of vehicle 100 from a GPS receiver. Sensor 22 is a general term for various sensors for detecting a situation outside the vehicle and the state of vehicle 100. As the sensor for detecting the situation outside the vehicle, for example, a camera, a millimeter-wave radar, a light detection and ranging, laser imaging detection and ranging (LIDAR), a temperature sensor, an atmospheric pressure sensor, a humidity sensor, and an illuminance sensor are mounted. The situation outside the vehicle includes a situation of a road where the subject vehicle travels, which includes lane information, an environment including weather, a surrounding situation of the subject vehicle, and other vehicles (such as other vehicles traveling in the adjacent lane) present nearby. Note that any information may be included as long as the information is vehicle exterior information that can be detected by sensor 22. Moreover, as the sensor 22 for detecting the state of vehicle 100, for example, an acceleration sensor, a gyroscope sensor, a geomagnetism sensor, and an inclination sensor are mounted.

Speed information acquisition unit 23 acquires the current speed of vehicle 100 from a speed sensor. Map information acquisition unit 24 acquires map information around the current location of vehicle 100 from a map database. The map database may be recorded in a recording medium in vehicle 100, or may be downloaded from a map server via a network when being used.

Automatic driving control device 30 is an automatic driving controller having an automatic driving control function mounted thereto, and determines a behavior of vehicle 100 in automatic driving. Automatic driving control device 30 includes controller 31, storage unit 32, and I/O unit (input or output unit) 33. A configuration of controller 31 can be implemented by cooperation between hardware resources and software resources or by only hardware resources. Hardware resources which can be used include a processor, a read only memory (a ROM), a random access memory (a RAM), and other large scale integrations (LSIs). Software resources which can be used include programs such as an operating system, applications, and firmware. Storage unit 32 has a non-volatile recording medium such as a flash memory. I/O unit 33 executes communication control according to various communication formats. For example, I/O unit 33 outputs information regarding the automatic driving to driving assistance device 40, and receives a control command from driving assistance device 40. I/O unit 33 receives the detection information from detector 20.

Controller 31 applies the control command input from driving assistance device 40 and the various pieces of information collected from detector 20 or the various ECUs to an automatic driving algorithm. Controller 31 then calculates control values for controlling automatic control targets such as a travel direction of vehicle 100. Controller 31 transmits the calculated control values to the ECUs or the controllers as the respective control targets. In the present exemplary embodiment, controller 31 transmits the calculated control values to the steering ECU, the brake ECU, the engine ECU, and the indicator controller. Note that, in a case of an electrically driven vehicle or a hybrid car, controller 31 transmits the control values to the motor ECU in place of or in addition to the engine ECU.

Driving assistance device 40 is an HMI controller that executes an interface function between vehicle 100 and a driver, and includes controller 41, storage unit 42, and I/O unit 43. Controller 41 executes a variety of data processing such as HMI control. Controller 41 can be implemented by cooperation between hardware resources and software resources or by only hardware resources. Hardware resources which can be used include a processor, a ROM, a RAM, and other LSIs. Software resources which can be used include programs such as an operating system, applications, and firmware.

Storage unit 42 is a storage area for storing data which is referred to or updated by controller 41. For example, storage unit 42 is implemented by a non-volatile recording medium such as a flash memory. I/O unit 43 executes various types of communication controls corresponding to various types of communication formats. I/O unit 43 includes operation input unit 50, image and sound output unit 51, detection information input unit 52, command interface (IF) 53, and communication IF 56.

Operation input unit 50 receives, from input device 4, an operation signal input by an operation performed for input device 4 by the driver, the occupant, or a user outside of vehicle 100, and outputs this operation signal to controller 41. Image or sound output unit 51 outputs image data or a sound message, which is generated by controller 41, to notification device 2 and causes notification device 2 to display this image data or sound data. Detection information input unit 52 receives, from detector 20, information (hereinafter referred to as "detection information") which is a result of the detection process executed by detector 20 and indicates the current surrounding situation and travel state of vehicle 100, and outputs the received information to controller 41.

Command IF 53 executes an interface process with automatic driving control device 30, and includes behavior information input unit 54 and command output unit 55. Behavior information input unit 54 receives information regarding the automatic driving of vehicle 100, the information having been transmitted from automatic driving control device 30. Then, behavior information input unit 54 outputs the received information to controller 41. Command output unit 55 receives, from controller 41, a control command which instructs automatic driving control device 30 on a manner of the automatic driving, and transmits this command to automatic driving control device 30.

Communication IF 56 executes an interface process with wireless device 8. Communication IF 56 transmits the data, which is output from controller 41, to wireless device 8, and transmits this data to an external device from wireless device 8. Moreover, communication IF 56 receives data transmitted from the external device, the data having been transferred by wireless device 8, and outputs this data to controller 41.

Presenting unit 60 includes a brake lamp, an indicator lamp, and the like, and presents the driving behavior of vehicle 100 externally from the vehicle. In specific description, when a brake is put on vehicle 100, the brake lamp turns on. When vehicle 100 turns right or left, the indicator lamp corresponding to the right turn or the left turn flashes. Such presenting of the driving behavior by presenting unit 60 is performed in a case of the automatic driving mode and also in a case of the manual driving mode. Note that specific presentation will be described later.

Note that, herein, automatic driving control device 30 and driving assistance device 40 are configured as individual devices. As a modification, automatic driving control device 30 and driving assistance device 40 may be integrated into one controller as indicated by a broken line in FIG. 1. In other words, one automatic driving control device may have a configuration of having both of the functions of automatic driving control device 30 and driving assistance device 40 in FIG. 1.

Figure 3:
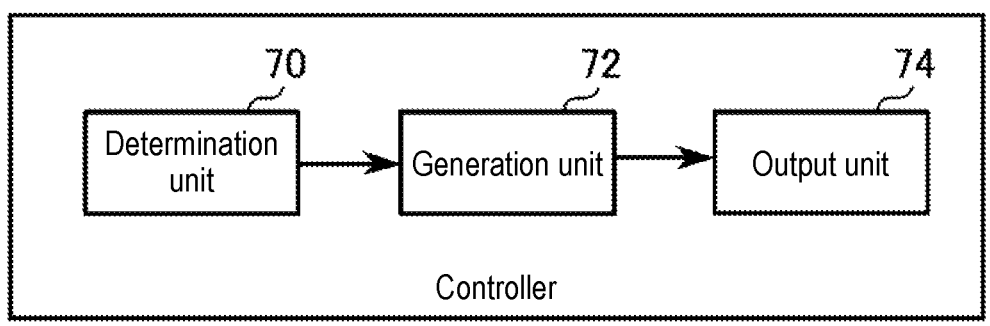
FIG. 3 is a diagram illustrating a configuration of a controller in FIG. 1.

FIG. 3 illustrates a configuration of controller 41. Controller 41 includes determination unit 70, generation unit 72, and output unit 74. Note that, in order to clarify the description, as one example, braking is regarded as the driving behavior to be performed on vehicle 100. Further, it is assumed that the driving mode of vehicle 100 is manual driving, and the braking is performed only by automatic driving only at an emergency time such as approximation of another preceding vehicle 100.

Determination unit 70 is connected to driving operation unit 10 via I/O unit 43 in FIG. 1, and is connected to automatic driving control device 30 via I/O unit 43. In a case where vehicle 100 manually travels and a driver steps on brake pedal 12, brake pedal 12 outputs a signal indicating braking performed by the driver (hereinafter, a "manual driving operation instruction") to I/O unit 43. Determination unit 70 receives the manual driving operation instruction via I/O unit 43. In a case where vehicle 100 travels automatically, automatic driving control device 30 determines that the braking is necessary and brakes vehicle 100. As a result, automatic driving control device 30 outputs a signal indicating the braking by automatic driving control device 30 (hereinafter, an "automatic driving operation instruction") to I/O unit 43. Determination unit 70 receives the automatic driving operation instruction via I/O unit 43.

When receiving the manual driving operation instruction, determination unit 70 determines that vehicle 100 is braked by the manual driving control, and when receiving the automatic driving operation instruction, determination unit 70 determines that vehicle 100 is braked by the automatic driving control. Determination unit 70 outputs a determination result, namely, the manual driving control or the automatic driving control to generation unit 72.

Generation unit 72 receives the determination result from determination unit 70. When the determination result indicates the manual driving control, generation unit 72 generates presentation instructing information for presenting the driving behavior performed by the manual driving control externally from the vehicle. When the determination result indicates the automatic driving control, generation unit 72 generates presentation instructing information for presenting the driving behavior performed by the automatic driving control externally from the vehicle. The presentation instructing information is a signal for controlling presenting unit 60 in FIG. 1, but prior to description of the presentation instructing information, a configuration of presenting unit 60 will be described.

Figure 4:
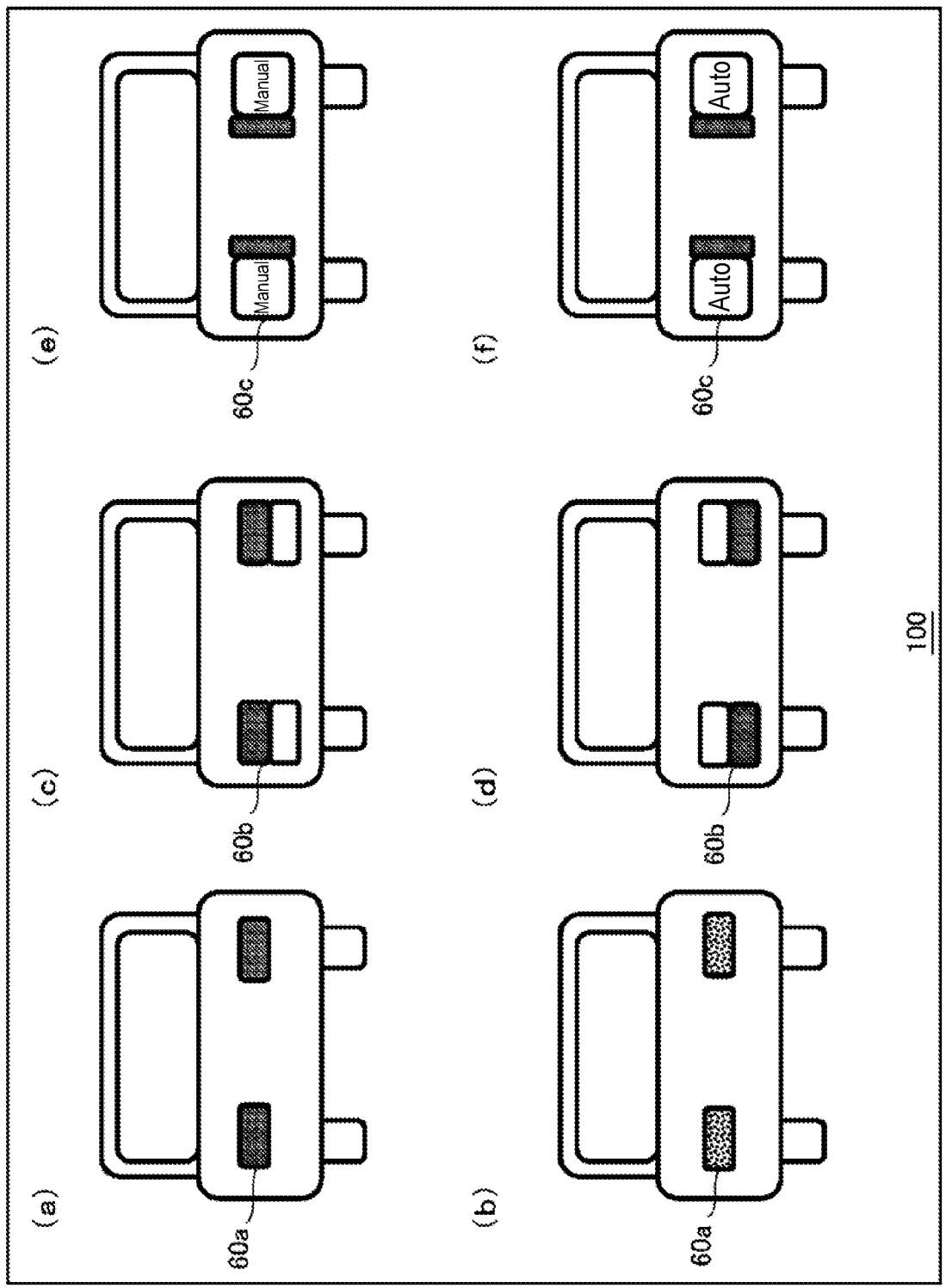
FIG. 4 is a diagram illustrating a configuration of a rear portion of the vehicle in FIG. 1.

Parts (a) to (f) of FIG. 4 are outside views illustrating a configuration of a rear part of vehicle 100 and when viewed from the rear part of vehicle 100. In parts (a) and (b) of FIG. 4, a rear surface of vehicle 100 has first presenting unit 60a as presenting unit 60. Herein, part (a) of FIG. 4 illustrates presentation in a case of manual driving, and part (b) of FIG. 4 illustrates presentation in a case of automatic driving. First presenting unit 60a is a brake lamp of a color light, and flashing of the color light corresponds to presentation. The color light can emit light of at least two colors, and the presentation light as the emission light varies in parts (a) and (b) of FIG. 4. That is, the presentation color of the color light varies according to the case of the manual driving and the case of the automatic driving. Meanings of the two colors are preferably standardized regardless of vehicle types and vehicle manufacturers.

In parts (c) and (d) of FIG. 4, the rear surface of vehicle 100 has second presenting unit 60b as presenting unit 60. Herein, part (c) of FIG. 4 illustrates the presentation in the case of the manual driving, and part (d) of FIG. 4 illustrates the presentation in the case of the automatic driving. Second presenting unit 60b is a brake lamp on which two-color lights are disposed up and down respectively, and flashing of the color lights corresponds to the presentation. The respective color lights have different presentation colors. The color light that emit light in part (c) of FIG. 4 is different from the color light that emits in part (d) of FIG. 4. That is, the color lights of different presentation colors emit light in the case of the manual driving and the case of the automatic driving. The meanings of the two colors are preferably are standardized regardless of vehicle types and vehicle manufactures.

In parts (e) and (f) of FIG. 4, the rear surface of vehicle 100 has third presenting unit 60c as presenting unit 60. Herein, part (e) of FIG. 4 illustrates presentation in the case of the manual driving, and part (f) of FIG. 4 illustrates the presentation in the case of the automatic driving. Third presenting unit 60c is a communication board disposed to be adjacent to the brake lamp, and display of characters corresponds to the presentation. In the case of the manual driving, the communication board displays characters "manual", and in the case of the automatic driving, the communication board displays characters "auto". That is, presentation on whether vehicle 100 is under manual driving or automatic driving is made based on a content of characters. The description returns to FIG. 3.

Generation unit 72 refers to a table based on the determination result to generate the presentation instructing information. FIG. 5 illustrates a data structure of the table stored in generation unit 72. As illustrated in the figure, the table includes items "presenting unit 60", "presentation in manual driving", and "presentation in automatic driving". The item "presenting unit 60" indicates presenting unit identification (ID) for identifying presenting unit 60 illustrated in parts (a) to (c) of FIG. 4, and the presenting unit IDs "1" to "3" correspond to first presenting unit 60a to third presenting unit 60c. Further, the presenting unit ID "4" corresponds to fourth presenting unit 60d, not illustrated. The items "presentation in manual driving" and "presentation in automatic driving" indicate a presenting method in the manual driving and a presenting method in the automatic driving, respectively. The presenting unit ID of presenting unit 60 mounted on vehicle 100 is stored in generation unit 72.

For example, when presenting unit 60 is first presenting unit 60a, and the determination result is the manual driving control, generation unit 72 generates presentation instructing information including "presentation color: red". When the determination result is the automatic driving control, generation unit 72 generates presentation instructing information including "presentation color: yellow". That is, the presentation instructing information to be generated by generation unit 72 indicates a presentation color, and indicates different presentation colors in a case where the driving behavior performed by the automatic driving control is presented externally from the vehicle, and a case where the driving behavior performed by the manual driving control is presented externally from the vehicle.

When presenting unit 60 is second presenting unit 60b, if the determination result is the manual driving control, generation unit 72 generates presentation instructing information including "presentation position: up". If the determination result is the automatic driving control, generation unit 72 generates presentation instructing information including "presentation position: down". That is, the presentation instructing information to be generated by generation unit 72 indicates a color light to be turned on, and indicates different color lights in the case where a driving behavior performed by the automatic driving control is presented externally from the vehicle and in a case where a driving behavior performed by the manual driving control is presented externally from the vehicle.

When presenting unit 60 is third presenting unit 60c, if the determination result is the manual driving control, generation unit 72 generates presentation instructing information including "presenting character: character 1 (manual)". If the determination result is the automatic driving control, generation unit 72 generates presentation instructing information including "presenting character: character 2 (auto)". That is, the presentation instructing information to be generated by generation unit 72 indicates characters to be lit. Different characters are used in the case where the driving behavior performed by the automatic driving control is presented externally from the vehicle and in the case where the driving behavior performed by the manual driving control is presented externally from the vehicle.

When presenting unit 60 is fourth presenting unit 60d, the presentation is instructed so that a presentation pattern of the brake lamp is different between the manual driving and the automatic driving. Herein, "presentation pattern: ON for 0.5 seconds, OFF for 0.5 seconds" indicates that the ON operation for 0.5 seconds and the OFF operation for 0.5 seconds are repeated. "Presentation pattern: ON for 0.5 seconds, OFF for 0.8 seconds" indicates that the ON operation for 0.5 seconds and the OFF operation for 0.8 seconds are repeated. If the determination result is the manual driving control, generation unit 72 generates presentation instructing information including "presentation pattern: ON for 0.5 seconds, OFF for 0.5 seconds". If the determination result is the automatic driving control, generation unit 72 generates presentation instructing information including "presentation pattern: ON for 0.5 seconds, OFF for 0.8 seconds". In this case, the presentation color may be or may not be specified. The description returns to FIG. 3.

Generation unit 72 outputs the presentation instructing information to output unit 74. Output unit 74 outputs the presentation instructing information from generation unit 72 to presenting unit 60 via I/O unit 43. Presenting unit 60 performs the presentation externally from the vehicle based on the presentation instructing information so that whether the braking is performed by the manual driving control or the automatic driving control becomes clear. For example, when presenting unit 60 is first presenting unit 60a and the braking is performed by the manual driving control, first presenting unit 60a emits red light as illustrated in part (a) of FIG. 4. On the other hand, when control is performed by the automatic driving control, first presenting unit 60a emits yellow light as illustrated in part (b) of FIG. 4. Note that the emission of red light indicating the braking performed by the manual driving control, and the emission of yellow light indicating the braking performed by the automatic driving control are standardized regardless of vehicle types and vehicle manufactures. For this reason, the presentation color of the color light makes it clear whether the braking is performed by the manual driving control or the automatic driving control.

If the driver stop pressing brake pedal 12, brake pedal 12 terminates output of the manual driving operation instruction. Further, if automatic driving control device 30 completes the braking of vehicle 100, automatic driving control device 30 terminates output of the automatic driving operation instruction. Thereafter, determination unit 70 outputs the completion of the braking to generation unit 72. When output unit 74 receives the completion of the braking from determination unit 70, the generation of the presentation instructing information is terminated, and presenting unit 60 terminates the presentation. Note that the automatic driving controller in FIG. 1 controls the automatic driving of vehicle 100 when the driving behavior of vehicle 100 is performed by the automatic driving control.

Figure 6:
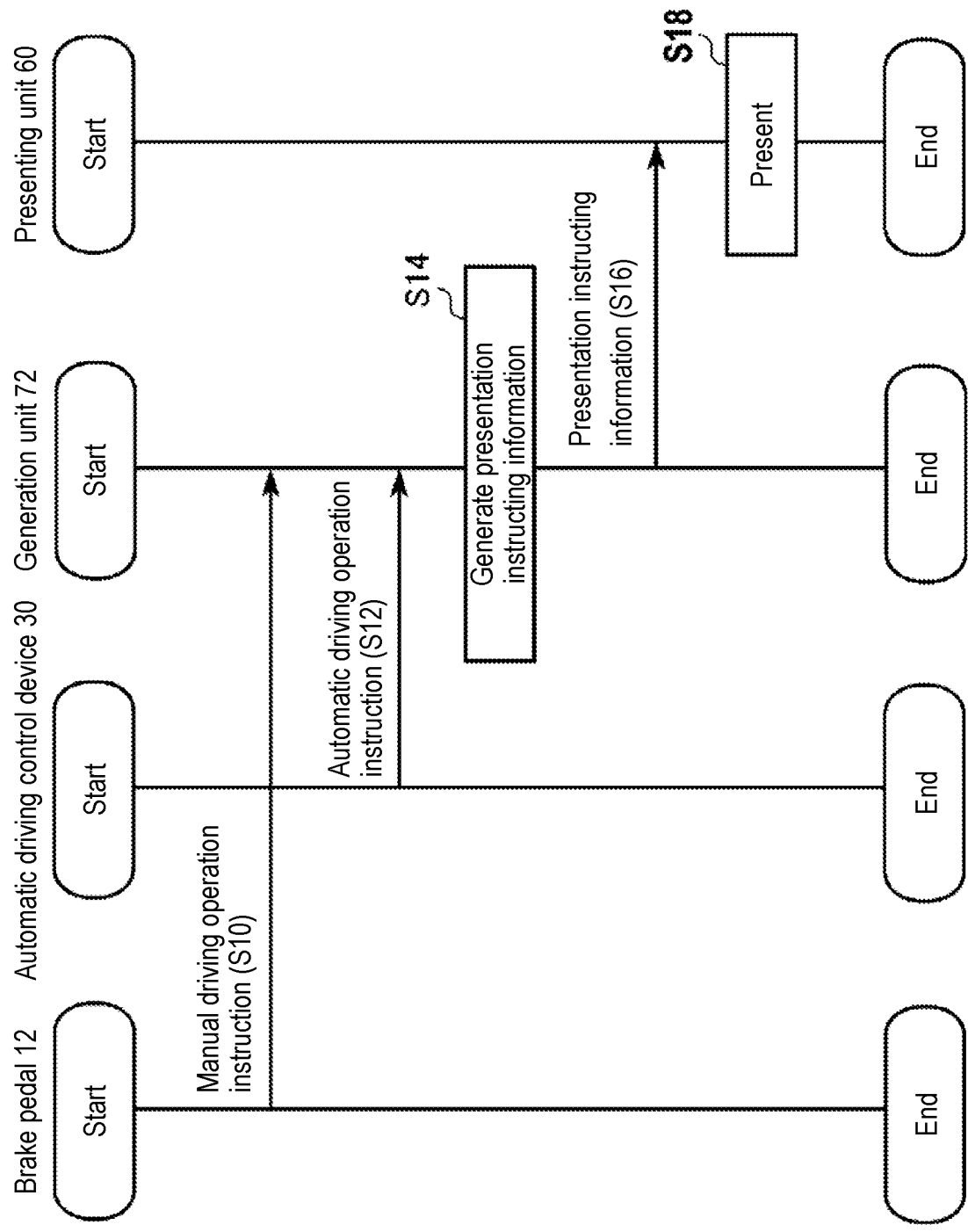
FIG. 6 is a sequence diagram illustrating a presenting procedure by the vehicle in FIG. 1.

An operation of driving assistance device 40 having the above configuration will be described. FIG. 6 is a sequence diagram illustrating a presenting procedure by vehicle 100. Brake pedal 12 outputs the manual driving operation instruction to generation unit 72 via determination unit 70 (S10). Automatic driving control device 30 outputs the automatic driving operation instruction to generation unit 72 via determination unit 70 (S12). Generation unit 72 generates the presentation instructing information (S14). Generation unit 72 outputs the presentation instructing information to presenting unit 60 via output unit 74 (S16). Presenting unit 60 performs presentation according to presentation instructing information (S18).

In the above description, the braking of vehicle 100 has been described as one example, but the similar process may be executed on the indicator lamp, namely, a direction indicator in the case of a right or left turn or a lane change regardless of the braking. In FIG. 3, when vehicle 100 manually travels, an operation performed on indicator switch 14 by the driver causes indicator switch 14 to output a signal representing the operation by the driver (hereinafter, a "manual driving operation instruction") to I/O unit 43. Determination unit 70 receives the manual driving operation instruction via I/O unit 43. In a case where vehicle 100 travels automatically, if automatic driving control device 30 determines a right or left turn or a lane change, automatic driving control device 30 outputs a signal representing the right or left turn or the lane change by automatic driving control device 30 (hereinafter, an "automatic driving operation instruction") to I/O unit 43. Determination unit 70 receives the automatic driving operation instruction via I/O unit 43.

Processes in determination unit 70, generation unit 72, and output unit 74 are similar to the processes described above except that the indicator lamp is used as presenting unit 60 instead of the brake lamp. FIG. 7 illustrates a data structure of another table stored in generation unit 72. Herein, fifth presenting unit 60*e*, sixth presenting unit 60*f*, and seventh presenting unit 60*g* are illustrated as presenting unit 60, but they are indicator lamps having different shapes. The description returns to FIG. 3.

Further, both the brake lamp at the time of the braking and the indicator lamp at the time of the right or left turn or the lane change are instructed to make the presentation according to a presentation pattern. In this case, if one subject determines the respective presentations, presentation pattern cycles match with each other. Herein, the subject that makes a determination corresponds to the manual driving control or the automatic driving control. Further, a starting time of the presentation pattern may be included in the presentation instructing information. When arrival timing of the presentation instructing information at the brake lamp is identical to arrival timing at the indicator lamp, presenting unit 60 may start lighting immediately after reception of the presentation instructing information. It becomes clear whether subjects that determine braking and a left turn are identical to each other according to whether the presentation patterns of the brake lamp and the winker lamp synchronize with each other, namely, whether turning-on and turning-off are repeated at identical timing in a scene of the left turn while braking.

Further, vehicle 100 in a current state has only the brake lamp indicating braking and the indicator lamp indicating a right or left turn or a lane change. However, when an acceleration lamp indicating acceleration is disposed in the future, the similar process may be executed also on the acceleration lamp. Further, in vehicle 100 in the current state, only when the driver presses the brake pedal, the brake lamp turns on. However, when the driver operates an engine brake explicitly or when the engine brake is operated by automatic driving control device 30, the brake lamp may be turned on.

Further, in vehicle 100 that is traveling through completely automatic driving for automatically executing all processes, a driver instructs (overrides) acceleration, braking, and steering explicitly. This case will be described Parts (a) to (d) of FIG. 8 illustrate another configuration of the rear part of vehicle 100. As illustrated in parts (a) to (d) of FIG. 8, sixth presenting unit 60*f* is disposed. For this reason, an upper lamp is caused to flash in the manual driving, and a lower lamp is caused to flash in the automatic driving. For example, when vehicle 100 is traveling on a freeway, automatic driving control device 30 determines to leave the freeway at the next interchange, and as illustrated in part (a) of FIG. 8, presentation of a left indicator lamp is started.

Automatic driving control device 30 performs acceleration, braking, and steering according to a predetermined traveling route based on a destination set in a navigation system mounted on vehicle 100. For this reason, the indicator lamp can be instructed to perform presentation at timing earlier than turning-on of the indicator lamp by an operation of indicator switch 14 performed by a driver. However, since the presentation position of the indicator lamp varies for determination subjects, a person who has viewed vehicle 100 outside the vehicle understands that the subject which has determined that vehicle 100 leaves the freeway is automatic driving control device 30, and might be changed by overriding by the driver. The person who has viewed vehicle 100 outside the vehicle can understand possibility of braking of vehicle 100 at early timing, and the person can use this possibility as a reference for driving.

As illustrated in part (a) of FIG. 8, when the lower lamp is caused to flash by automatic driving control device 30, the driver operates indicator switch 14 so that a left turn is indicated. As a result, as illustrated in part (b) of FIG. 8, the right upper lamp is caused to flash. As a result, the person who has viewed vehicle 100 from outside the vehicle can understand overriding is performed. Further, when the driver operates indicator switch 14 so that a left turn is indicated, as illustrated in part (c) of FIG. 8, intermediate presentation such that the presentation position gradually shifts is performed, and finally presentation illustrated in part (d) of FIG. 8 may be performed.

According to the present exemplary embodiment, upon the reception of the automatic driving operation instruction or the manual driving operation instruction, a determination is made whether the driving behavior of the vehicle is performed by the automatic driving control or the manual driving control. Further, since the determination is made whether the driving behavior of the vehicle is performed by the automatic driving control or the manual driving control, the presentation instructing information can be generated according to whether the driving behavior of the vehicle is performed by the automatic driving control or the manual driving control. Further, since the presentation instructing information is generated according to whether the driving behavior of the vehicle is the automatic driving control or the manual driving control, information on whether the driving behavior is performed by the automatic driving or the manual driving can be presented externally from the vehicle.

Further, since the presentation color is changed, information on whether the driving behavior is performed by the automatic driving or the manual driving can be presented externally from the vehicle. Further, since the light is changed, information on whether the driving behavior is performed by the automatic driving or the manual driving can be presented externally from the vehicle. Further, since characters are displayed, information on whether the driving behavior is performed by the automatic driving or the manual driving can be presented externally from the vehicle. Further, since the presentation pattern is changed, information on whether the driving behavior is performed by the automatic driving or the manual driving can be presented externally from the vehicle.

While the exemplary embodiment of the present invention has been described above with reference to the drawings, the functions of the above-mentioned devices and processing units can be implemented by a computer program. A computer that achieves the above-mentioned functions through execution of a program is provided with an input device such as a keyboard, a mouse and a touch pad, an output device such as a display and a speaker, a central processing unit (CPU), a storage device such as a read only memory (ROM), a random access memory (RAM), a hard disk device and a solid state drive (SSD), a non-transitory computer readable medium for reading information from a recording medium such as a digital versatile disk read only memory (DVD-ROM) and a universal serial bus (USB) memory, and a network card that performs communication through a network. The respective sections are connected by a bus.

The reading device reads the program from the recording medium recording the program therein, and the storage device stores the program. Alternatively, the network card performs communication with a server device connected to the network, and a program that implements the respective functions of the above-described devices and have been downloaded from the server device is stored in the storage device. Moreover, onto the RAM, the CPU copies the program stored in the storage device, and from the RAM, sequentially fetches instructions included in the program, and executes each of the instructions. In this way, the respective functions of the above-described devices are implemented.

An outline of an aspect of the present invention is as follows. A driving assistance device of a certain aspect of the present invention includes a determination unit that determines whether a driving behavior of a vehicle is performed by automatic driving control or manual driving control. Further, the driving assistance device includes a generation unit that generates presentation instructing information for presenting the driving behavior by the automatic driving control externally from the vehicle when the determination unit determines that the driving behavior of the vehicle is performed by the automatic driving control, and generates presentation instructing information for presenting the driving behavior by the manual driving control externally from the vehicle when the determination unit determines that the driving behavior of the vehicle is performed by the manual driving control, and an output unit that outputs the presentation instructing information generated by the generation unit.

According to this aspect, the presentation instructing information is generated according to whether the driving behavior of the vehicle is performed by the automatic driving control or the manual driving control. For this reason, information on whether the driving behavior is performed by the automatic driving or the manual driving can be presented externally from the vehicle.

The presentation instructing information to be generated by the generation unit indicates a presentation color, and indicates different presentation colors in the case where the driving behavior performed by the automatic driving control is presented externally from the vehicle and in the case where the driving behavior performed by the manual driving control is presented externally from the vehicle. In this case, since the presentation color is changed, information on whether the driving behavior is performed by the automatic driving or the manual driving can be presented externally from the vehicle.

The presentation instructing information to be generated by the generation unit indicates a light to be turned on, and different lights are presented in the case where the driving behavior performed by the automatic driving control is presented externally from the vehicle and in the case where the driving behavior performed by the manual driving control is presented externally from the vehicle. In this case, since the light is changed, information on whether the driving behavior is performed by the automatic driving or the manual driving can be presented externally from the vehicle.

Another aspect of the present invention provides an automatic driving control device. This device includes a determination unit that determines whether the driving behavior of the vehicle is performed by the automatic driving control or the manual driving control. Further, the device includes a generation unit that generates presentation instructing information for presenting the driving behavior by the automatic driving control externally from the vehicle when the determination unit determines that the driving behavior of the vehicle is performed by the automatic driving control, and generates presentation instructing information for presenting the driving behavior by the manual driving control externally from the vehicle when the determination unit determines that the driving behavior of the vehicle is performed by the manual driving control. Further, the device includes an output unit that outputs the presentation instructing information generated by the generation unit, and an automatic driving controller that controls automatic driving of the vehicle when the driving behavior of the vehicle is performed by the automatic driving control.

Still another aspect of the present invention provides a vehicle. This vehicle includes a driving assistance device. The driving assistance device includes a determination unit that determines whether a driving behavior of the vehicle is performed by automatic driving control or manual driving control, a generation unit that generates presentation instructing information for presenting the driving behavior by the automatic driving control externally from the vehicle when the determination unit determines that the driving behavior of the vehicle is performed by the automatic driving control, and generates presentation instructing information for presenting the driving behavior by the manual driving control externally from the vehicle when the determination unit determines that the driving behavior of the vehicle is performed by the manual driving control, and an output unit that outputs the presentation instructing information generated by the generation unit.

Still another aspect of the present invention provides a driving assistance method. This method incudes determining whether the driving behavior of the vehicle is performed by the automatic driving control or the manual driving control. Further, the method includes generating presentation instructing information for presenting the driving behavior performed by the automatic driving control externally from the vehicle when the determination unit determines that the driving behavior of the vehicle is performed by the automatic driving control, and generating presentation instructing information for presenting the driving behavior by the manual driving control externally from the vehicle when the determination unit determines that the driving behavior of the vehicle is performed by the manual driving control, and outputting the presentation instructing information having been generated.

The present invention has been described above based on the exemplary embodiment. It will be understood by those skilled in the art that the exemplary embodiment is merely an example, other exemplary modifications in which components and/or processes of the exemplary embodiment are variously combined are possible, and the other exemplary modifications still fall within the scope of the present invention.

INDUSTRIAL APPLICABILITY

The present invention is applicable to a driving assistance method, and a driving assistance device, an automatic driving control device, a vehicle, and a program using the driving assistance method.

REFERENCE MARKS IN THE DRAWINGS 2 notification device
4 input device
6 speaker
8 wireless device
10 driving operation unit
20 detector
30 automatic driving control device
31 controller
32 storage unit
33 I/O unit 40 driving assistance device
41 controller
42 storage unit
43 I/O unit
60 presenting unit
70 determination unit
72 generation unit
74 output unit
100 vehicle

The invention claimed is:

1. A driving assistance device comprising:
a processor; and
a memory coupled to the processor, the memory storing a program that, when executed by the processor, causes the driving assistance device to:
in response to an instruction for executing a predetermined driving behavior of a vehicle being received, determine, based on the instruction, whether the predetermined driving behavior of a vehicle is performed by automatic driving control or manual driving control, the predetermined driving behavior being a driving operation of the vehicle;
generate presentation instructing information for presenting the predetermined driving behavior performed by the automatic driving control externally from the vehicle in a case where the predetermined driving behavior of the vehicle is performed by the automatic driving control;
generate presentation instructing information for presenting the predetermined driving behavior performed by the manual driving control externally from the vehicle in a case where the predetermined driving behavior of the vehicle is performed by the manual driving control; and
output the presentation instructing information to a presenting unit that is used by the predetermined driving behavior.

2. The driving assistance device according to claim 1, wherein
the presentation instructing information indicates a light color for resenting the predetermined driving behavior,
the light color varies according to the case where the predetermined driving behavior of the vehicle is performed by the automatic driving control and the case where the predetermined driving behavior of the vehicle is performed by the manual driving control.

3. The driving assistance device according to claim 1, wherein
the presentation instructing information indicates a light on and off state for presenting the predetermined driving behavior, and
the light on and off state varies according to the case where the predetermined driving behavior of the vehicle is performed by the automatic driving control and the case where the predetermined driving behavior of the vehicle is performed by the manual driving control.

4. The driving assistance device according to claim 1, wherein the program, when executed by the processor, causes the driving assistance device to:
terminate generation of the presentation instructing information in response to the instruction executing the predetermined driving behavior being terminated.

5. The driving assistance device according to claim 1, wherein the program, when executed by the processor, causes the driving assistance device to:
in a case where parameters of a plurality of driving behaviors are identical to each other, synchronize presentation patterns of a plurality of pieces of presentation instructing information generated for the plurality of driving behaviors with each other.

6. The driving assistance device according to claim 1, wherein the predetermined driving behavior is at least one of a steering operation, a lane change operation, or a braking operation.

7. A driving assistance method comprising:
in response to an instruction for executing a predetermined driving behavior of a vehicle being received, determining, based on the instruction, whether the predetermined driving behavior of a vehicle is performed by automatic driving control or manual driving control, the predetermined driving behavior being a driving operation performed by the vehicle;
generating presentation instructing information for presenting the predetermined driving behavior performed by the automatic driving control externally from the vehicle in a case where the predetermined driving behavior of the vehicle is performed by the automatic driving control;
generating presentation instructing information for presenting the predetermined driving behavior performed by the manual driving control externally from the vehicle in a case where the predetermined driving behavior of the vehicle is performed by the manual driving control; and
outputting the presentation instructing information to a presenting unit that is used by the predetermined driving behavior.

8. The driving assistance method according to claim 7, wherein
the presentation instructing information indicates a light color for presenting the predetermined driving behavior,
the light color varies according to the case where the predetermined driving behavior of the vehicle is performed by the automatic driving control and the case where the predetermined driving behavior of the vehicle is performed by the manual driving control.

9. The driving assistance method according to claim 7, wherein
the presentation instructing information indicates a light on and off state for presenting the predetermined driving behavior,
the light on and off state varies according to the case where the predetermined driving behavior of the vehicle is performed by the automatic driving control and the case where the predetermined driving behavior of the vehicle is performed by the manual driving control.

10. The driving assistance method according to claim 7, further comprising:
terminating generation of the presentation instructing information in response to the instruction executing the predetermined driving behavior being terminated.

11. The driving assistance method according to claim 7, further comprising:
in a case where parameters of a plurality of driving behaviors are identical to each other, synchronizing presentation patterns of a plurality of pieces of presentation instructing information generated for the plurality of driving behaviors with each other.

* * * * *